United States Patent [19]

Holzmann

[11] Patent Number: 4,600,803

[45] Date of Patent: Jul. 15, 1986

[54] CABLE SCREW JOINT

[76] Inventor: Hermann Holzmann, Salzäckerstr. 59, 7000 Stuttgart-80, Fed. Rep. of Germany

[21] Appl. No.: 677,990

[22] Filed: Dec. 4, 1984

[30] Foreign Application Priority Data

May 22, 1984 [DE] Fed. Rep. of Germany ....... 3418978

[51] Int. Cl.$^4$ ............................................... H02G 3/06
[52] U.S. Cl. ................................ 174/65 SS; 285/343; 279/123
[58] Field of Search ................ 174/65 SS; 339/103 R; 285/158, 151, 343, 322; 279/122, 123

[56] References Cited

U.S. PATENT DOCUMENTS 4,250,348  2/1981  Kitagawa ......................... 174/65 SS

FOREIGN PATENT DOCUMENTS 2132951  1/1973  Fed. Rep. of Germany ...... 285/343
2631996  1/1978  Fed. Rep. of Germany ... 174/65 SS Primary Examiner—Arthur T. Grimley
Assistant Examiner—D. A. Tone Attorney, Agent, or Firm—McAulay, Fields, Fisher, Goldstein & Nissen

[57] ABSTRACT

The invention relates to a screw joint of plastic for leading-in, leading-through, sealing and pull-relieving cables, lines or other thread-like elements (cable screw joint) comprising an intermediate connection piece with a sealing body inserted therein, and a box nut. The intermediate connection piece is provided with clamping tongues formed integrally therewith and extending coaxially thereto, which clamping tongues retain between them the mounted cable. The arrangement of the clamping tongues is such that when the box nut is turned at least one, preferably more clamping tongues distributed evenly over the circumference are urged inwardly in a selective manner and out of the remaining annular clamping tongue arrangement to exert upon the cable, preferably through the interposed packing, a deforming pressure providing positive protection against torsion of the cable relative to the cable screw joint. The fact that certain clamping tongues can be tilted inwardly in a selective manner provides further an expansion of the pressing area in the axial direction, which in turn leads to a reduction of the specific pressure.

5 Claims, 6 Drawing Figures

CABLE SCREW JOINT

STATE OF THE ART

The present invention relates to a cable screw joint, i.e. a plastic screw joint for leading-in, leading-through, sealing and pull-relieving cables, lines or hoses, of the type specified in the main claim.

A cable screw joint of this type has been known for instance from German Patent Disclosure No. 1 750 095 and also from German Patent Publication No. 26 31 996. All of the known cable screw joints comprise an intermediate connection piece provided with external threads on both ends so that on the one hand it can be mounted by its outer thread on a mounting face or housing partition wall, or the like, while a screw cap or box nut can be screwed upon its other end; further clamping tongues provided in annular arrangement about a concentrical central passage opening for the cable or the like, which tongues either can be formed integrally with, and coaxially to the intermediate connection piece or can be held by a separate clamping tongue cage connected with the intermediate connection piece; and finally the before-mentioned screw cap or box nut which when being screwed upon the intermediate connection piece, i.e. when being turned, forms by a tapering annular collar sort of a bearing face urging the clamping tongues towards the introduced cable or the like so that the latter is finally clamped in position. Usually, there is further provided a packing inside of the sealing tongues.

The cable lead-in according to German Patent Publication No. 26 31 996 comprises in addition a protection against torsion effective between the screw cap on the one hand and the intermediate connection piece on the other hand and acting in the manner of a ratchet between the clamping tongues, which have been urged together to a small diameter to overlap each other in the form of a fan, and a bevel gearing provided on the inside of the screw cap. It may be regarded as a problem in these known cable screw joints that when tightening the screw cap the operator feels at a relatively early stage a notable counter-force which is, however, the result of the fact that the bearing face of the screw cap has to force the clamping tongues together to an ever decreasing diameter whereby the tongues come to overlap like a fan due to their tapering segmentation (German Patent Disclosure No. 26 31 996). This does not, however, mean that a safe clamping and sealing action on the introduced cable has already been achieved at this point. In practice, this can be tested only by pulling the cable to see whether or not the clamping effect is sufficient. The protection against torsion effective between the screw cap and the intermediate connection piece is also of no help in this connection firstly because it acts only between the two before-mentioned elements so that it does not protect the cable itself against torsion, and secondly because its action, too, sets in at a very early point of the screwing operation of the screw cap so that it may even lead to an error on the operator's part regarding the clamping effect in case the operator should erroneously think that the action of the protection against torsion ensures at the same time an effective clamping connection between the cable on the one hand and the screw joint on the other hand.

On the other hand, if the clamping tongues are arranged from the very beginning at a substantial distance relative to each other—in which case either a separate clamping cage may be provided or the clamping tongues may be formed integrally with the intermediate connection piece, then no closed annular form of the clamping elements will be obtained when the screw cap is turned; the individual clamping tongues are urged inwardly in a uniform manner, but their pointed ends, which may be rather sharp, may dig into the cable, in particular when they act directly upon the cable outside of the packing—a condition intended in the cable screw joint described in German Patent Publication No. 31 09 583. This creates, however, a risk of damage to the cable insulation, for it is impossible to see how deep the clamping tongues have dug into the cable because the relevant area is covered up by the tapering upper edge of the screw cap.

On the other hand, an arrangement in which the clamping tongues are arranged close to each other, with radially extending slots provided between them, offers the particularly problematic disadvantage that when the spacings between the clamping tongues provided by the slots have been overcome by the action of the screw cap no further rotation of the screw cap is possible because the clamping tongues cannot be compressed any further. There exists, however, the risk that the introduced cable may not be sufficiently clamped when this final position has been reached.

Now, it is the object of the present invention to provide a cable screw joint which, while retaining the basic structure composed of only few parts, ensures on the one hand that a perfect clamping effect is exerted at all times upon the introduced cable or a corresponding other hose-like element while providing on the other hand a defined protection against torsion between the cable and the cable screw joint which does not only depend on the clamping effect achieved (frictional protection against torsion), but constitutes a genuine positive protection against torsion.

ADVANTAGES OF THE INVENTION

The invention achieves this object by the features specified in the characterizing part of the main claim and offers the advantage that at least one clamping tongue protruding from the annular arrangement of the clamping tongues exerts a deforming pressure on the cable, the hose or another similar thread-shaped element introduced into the joint so that the entire assembly comprising the cable, the packing and the clamping tongues assume altogether a complementary non-circular shape, while on the other hand the perfect sealing effect can be maintained over the hole circumference of the packing between the cable, the packing and the clamping tongues.

It is a further considerable advantage in this connection that due to the particular arrangement and configuration of the clamping tongue segments, which form an oblique plane, certain ones of the clamping tongues, i.e. at least one of the clamping tongues, can easily be urged inwardly and out of the outer annular arrangement so that the screw cap or box nut can be tightened without any problem until a real and notable clamping effect is exerted upon the cable. This phenomenon is due to the fact that the at least one clamping tongue, forming an oblique plane on both sides similar to a wedge, can be easily displaced from its normal position in the outer annular clamping tongue arrangement which reduces also the normal resistance of the annular clamping tongue arrangement against any further tightening of the box nut because such further tightening would require considerable deformations and overlapping movements. A real counter-force is felt by the operator only at the moment when a defined clamping effect is achieved and when, consequently, the cable is in effect properly sealed and held against torsion in the cable screw joint.

It should be noted in this connection that the clamping tongues which protrude inwardly from the peripheral annular clamping tongue arrangement already at the very beginning of the screwing operation are prevented from digging into the cable because on the one hand the change in level, relative to the level of the clamping tongues remaining in the outer annular clamping tongue arrangement, resulting from their early advance movement is only unimportant, though effective - a phenomenon which will be explained in detail further below - and because on the other hand, instead of acting outside of the packing, the clamping tongues urged inwardly exert their deforming force upon the cable and the packing through the packing.

On the other hand, the different levels of the active clamping tongues—some of them have been forced inwardly by rotation of the box nut, while the others have remained in the outer annular arrangement—result in a distribution of the clamping, deforming and holding forces also in the axial direction so that a lower specific pressure per surface unit is obtained, in spite of an increased holding effect and absolutely safe sealing and protection against torsion.

The features specified in the subclaims provide advantageous developments and improvements of the screw joint defined by the main claim. A particularly advantageous arrangement is obtained when the individual inwardly protruding clamping tongues are provided in symmetrical distribution over the full circle of the annular clamping tongue arrangement, for example in such a manner that three clamping tongues spaced at 120° are provided with segmentations forming oblique planes and acting on both sides in the same direction so that the pattern of the pressing and deforming forces acting upon the clamped cable resembles the shape of a triangle.

DRAWING

One embodiment of the invention will be described hereafter in detail with reference to the drawing in which.

Figure 3:
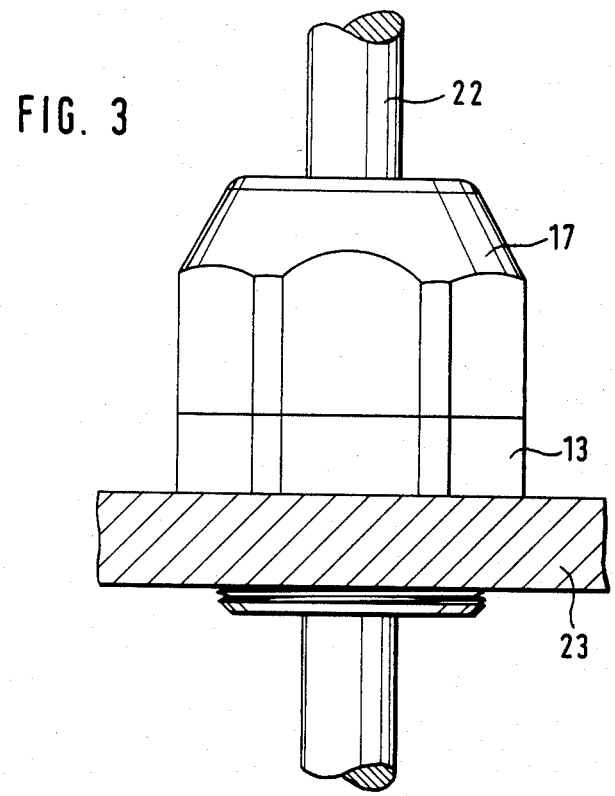
Figure 4:
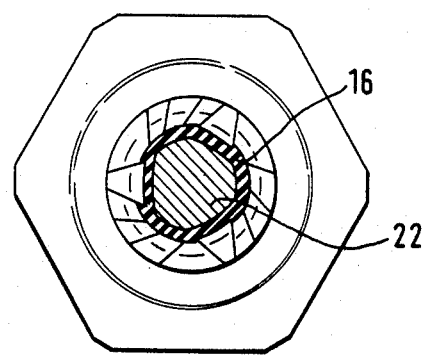

FIG. 3 shows a side view of a cable screw joint according to the invention with a cable clamped therein, mounted on a suitable mounting face; and FIG. 4 shows a top view of the cable screw joint of FIG. 3, the top end of the cable being removed so that the clamping effect and protection against torsion achieved by the segmentation of the invention and the inward protrusion of selective clamping tongues can be clearly seen.

DESCRIPTION OF THE EMBODIMENTS

The basic idea of the present invention consists in that there is provided in the peripheral annular arrangement of the clamping tongues disposed in coaxial arrangement on the outside of the intermediate connection piece, at least one, preferably however several clamping tongues designed and arranged relative to the other clamping tongues in such a manner, for example by suitable segmentation or arrangement of the separating slots between the individual clamping tongues, that when the screw cap or box nut is tightened, these individual clamping tongues are selectively urged inwardly towards the clamped cable and the packing present between themselves and the cable so that when the clamping effect acting on the cable begins to make itself felt, the cable is immediately forced or deformed into a non-circular shape. This non-circular shape is complementary, which means that the cable assumes this non-circular shape on its outside through the effect of the intermediate packing, and the cable lead-in assumes the same, complementary non-circular shape as a result of the specific position of the selective clamping tongues obtained by rotation of the box nut, so that any unwanted torsion is rendered impossible.

Accordingly, the present invention encompasses all imaginable possibilities provided by a particular design of the segmentation and/or shape of the individual clamping tongues that permits the latter to be selectively moved inwardly and out of the normal annular arrangement of the other clamping tongues when the box nut is screwed in.

Figure 1A:
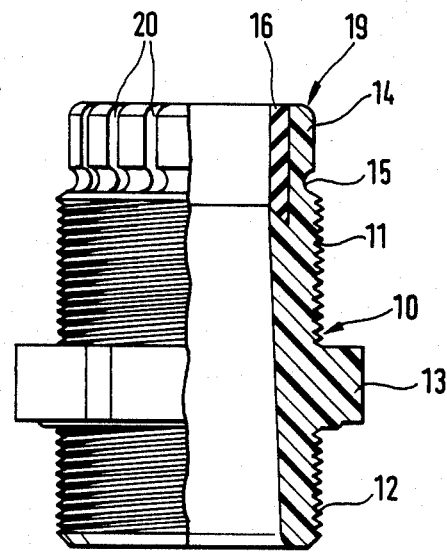
FIGS. 1a and 1b show a side view, one half in sectional representation, and a top view of one embodiment of an intermediate connection piece of the cable lead-in according to the invention.
Figure 1B:
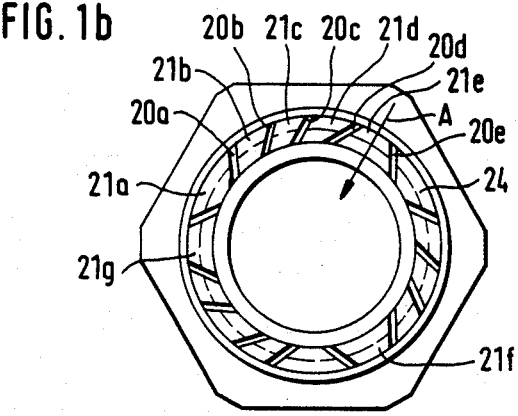
Figure 2A:
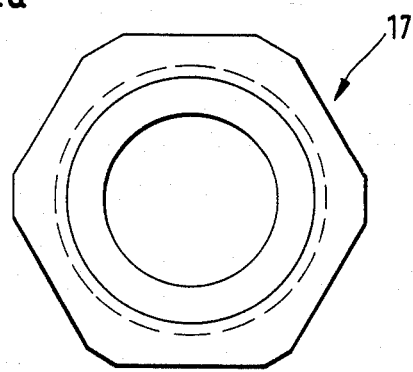
FIGS. 2a and 2b show top and side views, one half in sectional representation, of the screw cap or box nut.
Figure 2B:
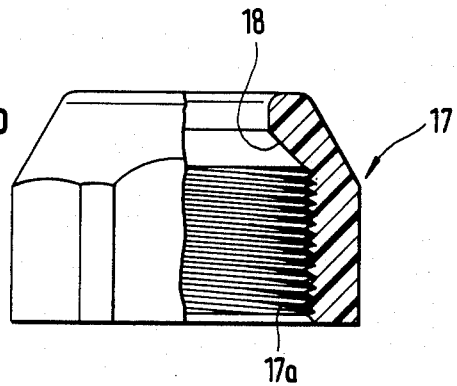

FIGS. 1a and 1b show the intermediate connection piece 10 comprising the clamping tongues which are in this case integrally formed with the connection piece, further the outer thread 11 for fitting the box nut and the outer thread 12 for mounting the connection piece on a suitable mounting face, housing partition wall, lead-in or the like. The intermediate connection piece comprises in the usual manner an outer mounting collar 13 of hexagonal shape by which it normally rests against the mounting face. The upper end of the intermediate connection piece 10—as viewed in the drawing—ends in clamping segments, teeth or clamping tongues 14. In the following description, the latter expression will be used only. In the embodiment shown in the drawing, the clamping tongues are formed integrally with the intermediate connection piece 10 and are provided on the outside with an annular groove or recess 15 intended, for example, to provide improved flexibility, although the necessary strength is of course maintained. A cylindrical packing body 16 inserted inwardly of the clamping tongues and extending over the full height thereof is retained in place before assembly practically undetachably by a certain clamping effect when the box nut is mounted during transport. In effect, the entire cable screw joint consists of the intermediate connection piece 10, the packing body 16 and the box nut 17 shown in FIGS. 2a and 2b. The latter may be of conventional design comprising an inner thread 17a as shown in FIG. 2b, and an upper inwardly tapering edge portion in the transition area to a smaller inner diameter, forming an inner annular face 18 which is inclined relative to the upper edge portion of the clamping tongues 14 provided on the intermediate connection piece 10. The interaction of the upper end portions of the clamping tongues 14, or more precisely the transition areas 19 and the oblique plane of the supporting face 18 thus formed leads to the known effect that the clamping tongues are urged inwardly to an ever decreasing diameter as the box nut 17 is screwed upon the outer thread. The length of the mounting thread 11 on the intermediate connection piece 10 and the length of the inner thread 17a of the box nut are selected to ensure that the box nut has to perform a greater number of turns on the intermediate connection piece before the annular bearing face 18 starts to exert pressure upon the clamping tongues so that the box nut is held safely on the intermediate connection piece by a greater number of turns before the quite considerable interaction of forces with the clamping tongues during clamping of the cable becomes effective.

In FIGS. 1a and 1b it can be seen that the individual clamping tongues are disposed relatively close to and adjacent each other and separated by slots 20 which in the embodiment shown take the form of oblique slots of the type known as such from German Patent Specification No. 21 32 951 in connection with a packing body of a sealing lead-in.

Regarding the segmentation, i.e. the design of the slots, according to the present invention, it is, however, of particular importance that a pre-determined number of individual slots 20a, 20b, 20c, 20d arranged along a secant over the periphery of the annular arrangement of the clamping tongues, which are all inclined in the same direction, as shown in FIG. 1b, are followed by an oppositely directed slot 20e, i.e. an oppositely directed segmentation providing at least one particular so-called selective clamping tongue 21e. Due to this design, on the one hand the known fan-like overlapping effect is achieved for the clamping tongues 21a, 21b, 21c, 21d separated by the segmentations or slots 20a, 20b, 20c, 20d, while on the other hand, due to the particular segmentation, the next clamping tongue 21e following in the direction of the circle in FIG. 1b is exposed, when the box nut is turned, to a force which can be clearly recognized by the viewer as an inwardly directed force, i.e. one acting in the direction indicated by arrow A. Consequently, this one clamping tongue 21e, and maybe further clamping tongues distributed over the periphery, are urged inwardly when the box nut is screwed on, while the remaining clamping tongues remain in contact with the bearing surface 18 of the box nut and are moved together gradually to a decreasing diameter. It can be clearly seen that three of the clamping tongues which are selectively subjected to pressure, namely the clamping tongue 21e and further clamping tongues 21f, 21g spaced about the circumference of the clamping tongue arrangement by 120°, are subjected due to their wedge shape to an inwardly directed pressure acting on both sides so that they will come out of the peripheral annular arrangement of the remaining clamping tongues leaving their place to the other clamping tongues so that the ring of the other clamping tongues can be reduced in diameter without substantial resistance, while the selectively active clamping tongues 21e, 21f, 21g are urged inwardly progressively by the two adjament clamping tongues, again without substantial resistance.

Investigations have shown that when the box nut has been screwed on, the expected pattern of forces and positive pressure and holding effects on the clamped cable 22 as shown in FIG. 4 is actually achieved. One clearly recognizes in this figure the triangular shape of the outer face of the cable 22 produced by the deforming effect of the selective clamping tongues 21e, 21f, 21g, and also the triangular shape of the inner face of the annular clamping tongue arrangement as a whole, separated from the cable by the intermediate packing 16. This triangular shape is noncircular and provides positive protection against torsion for the cable so that the latter is prevented absolutely from changing its angular position within the cable lead-in, even under great external torsional strain.

Mounting of the cable lead-in according to the invention is effected as shown in FIG. 3. To this end, initially the intermediate connection piece 13 is screwed upon the mounting surface 23 by its lower thread and if necessary retained in position by a check nut not shown in the drawing, whereupon the cable 22 or another suitable longitudinal element is passed through the connection piece and the box nut 17 is mounted and tightened until a certain effort is required to turn the nut further. When this point is reached, the cable is safely pull-relieved in a manner providing no risk of damage to the cable, protected against torsion via the packing body, and perfectly sealed on its periphery. The protection against torsion achieved between the intermediate connection piece on the one hand and the clamped cable on the other hand is not, or to the least degree, derived from the clamping effect, i.e. a frictional effect, but rather and mainly from the non-circularity of the components participating in this process, i.e. the positive connection between the said components which engage each other in the manner of a toothing.

Besides, it appears from the representation of FIG. 1b that due to the wedge-type shape of the clamping tongues of selective ones of the tongues arranged for being moved inwardly, other wedge-shaped clamping tongues are directly adjacent the said selective clamping tongues. Reference is made here only to the clamping tongue 24 in FIG. 1b. Although the two sides of these other clamping tongues are likewise inclined relative to each other in the form of a wedge, they are held by the action of the oblique face 18 of the box nut and retained within the annular arrangement together with the other clamping tongues 20a, 20b . . . while a degree of freedom in inward direction is obtained for the selective clamping tongues 21e, 21f, 21g only.

Attention is drawn once more to the easy motion of the screw joint—the wedge shape of the selective clamping tongues and the fact that they disengage from the remaining annular arrangement of clamping tongues permit the annular clamping tongue arrangement to be reduced in diameter without any notable resistance so that a real counter-force rendering the screwing operation of the box nut increasingly difficult will make itself felt only after an effective clamping and retaining effect has been obtained.

As has been explained before, the invention is based on the idea that when moving inwardly the selective clamping tongues deform the cable to a non-circular shape—a result that can be obtained also by other solutions. According to another embodiment of the present invention, certain ones of the clamping tongues exhibit from the very beginning a greater extension in the radial direction than others so that they are engaged by the inclined bearing face 18 earlier than the remaining tongues. Accordingly, these so-called selective clamping tongues will then be pushed inwardly from the annular clamping tongue arrangement earlier than the other clamping tongues so that they will produce a non-circular shape when the arrangement of the other clamping tongues is gradually reduced in diameter by overlapping as a result of their fan-shaped segmentation. Here again, a non-circular shape of the total configuration including the clamping tongues, the annular arrangement and the clamped cable, can easily be obtained. Still, the first configuration would seem preferable for production considerations and also because it can be pre-assembled without any problems. Besides, if the solution comprising selective clamping tongues with an increased radial extension is used, the configuration of the segmentation is no longer of decisive importance. The clamping tongues may in this case be arranged at an increased spacing because initially only the radially extended clamping tongues are bent inwardly until the bearing face 18 of the box nut gets into contact with the remaining clamping tongues to urge them inwardly. The slots between the tongues may in this case extend either obliquely or along a straight radial line.

All features mentioned in the specification and the following claims and shown in the drawings may be essential to the invention either alone or in any desired combination.

I claim:

1. A plastic screw joint including a hollow cylindrical intermediate connection piece having a box nut, said intermediate connection piece being provided with circularly arranged clamping tongues forming an annular clamping tongue arrangement, said clamping tongues urging the sealing body inwardly against a workpiece as the box nut is screwed on, wherein the clamping tongues are segmented and arranged adjacent to each other and when the clamping tongues are positioned closely adjacent each other, they are separated by slots, inclined obliquely relative to the respective diameter, and a predetermined number of such slots is followed by a slot inclined by the same angle but in opposite direction so that a wedge-like shape is obtained for every selective clamping tongue being disposed between two such oppositely directed slots due to which shape it is urged inwardly and out of the remaining annular clamping tongue arrangement when the box nut starts to exert pressure, whereby a non-circular relation between the cable and the annular clamping tongue arrangement is obtained.

2. A screw joint according to claim 1, characterized in that when the box nut has been screwed on, two active areas are formed at different axial heights between the mounted-cable and the selective clamping tongues that have been urged inwardly and the remaining annular clamping tongue arrangement, so that all of the pressure forces exerted by the clamping tongues for pull-relieving and protecting the workpiece against torsion are distributed over an axial surface area resulting in a reduction of the specific pressure force.

3. A screw joint according to claim 1, characterized in that the clamping tongues are formed integrally with the hollow-cylindrical intermediate connection piece and coaxially thereto, to form said annular clamping tongue arrangement.

4. A screw joint according to claim 1, characterized in that three selective clamping tongues formed by a corresponding segmentation are spaced uniformly about the circumference of the annular clamping tongue arrangement at angles of 120 degrees.

5. A screw joint according to claim 1, characterized in that all clamping tongues cut upon the workpiece via an interposed annular packing extending in the axial direction.

* * * * *